(12) United States Patent
Kishida et al.

(10) Patent No.: US 12,026,988 B2
(45) Date of Patent: Jul. 2, 2024

(54) STATE ESTIMATION DEVICE, STATE ESTIMATION METHOD AND STATE ESTIMATION PROGRAM

(71) Applicant: TOYOTA JIDOSHA KABUSHIKI KAISHA, Aichi-ken (JP)

(72) Inventors: Keiji Kishida, Toyoake (JP); Michito Norimoto, Miyoshi (JP); Kanji Inoko, Toyota (JP); Ayuka Ohta, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 354 days.

(21) Appl. No.: 17/462,001

(22) Filed: Aug. 31, 2021

(65) Prior Publication Data
US 2022/0157091 A1    May 19, 2022

(30) Foreign Application Priority Data
Nov. 18, 2020    (JP) ................. 2020-191896

(51) Int. Cl.
*G07C 5/00*    (2006.01)
*G07C 5/08*    (2006.01)
*H04W 4/40*    (2018.01)
*H04W 72/23*    (2023.01)

(52) U.S. Cl.
CPC ........... *G07C 5/008* (2013.01); *G07C 5/0816* (2013.01); *H04W 4/40* (2018.02); *H04W 72/23* (2023.01)

(58) Field of Classification Search
None
See application file for complete search history.

(56) References Cited

U.S. PATENT DOCUMENTS

| | | |
|---|---|---|
| 2009/0083206 A1 | 3/2009 | Shigemori |
| 2016/0155056 A1 | 6/2016 | Shiozaki et al. |
| 2017/0205468 A1* | 7/2017 | Park ............... H01M 10/425 |
| 2019/0188611 A1* | 6/2019 | Wu ................. G06Q 10/04 |
| 2019/0228329 A1* | 7/2019 | Utsumi ............ G06Q 30/0202 |
| 2021/0181256 A1* | 6/2021 | Kawamura ......... G01R 31/392 |

FOREIGN PATENT DOCUMENTS

| | | |
|---|---|---|
| JP | 2006309709 A | 11/2006 |
| JP | 2016-103243 A | 6/2016 |
| JP | 2018-163515 A | 10/2018 |

* cited by examiner

*Primary Examiner* — Todd Melton
*Assistant Examiner* — Sarah A. Mueller
(74) *Attorney, Agent, or Firm* — HAUPTMAN HAM, LLP (57) ABSTRACT

In estimation of a future state of a first product (an estimation-target individual), a first estimated extrapolation value is calculated from data on a past side of data relevant to the first product, and a second estimated extrapolation value is calculated from data relevant to a second product (a same-type different-individual of the estimation-target individual) that is different from the first product. A synthesis ratio between the first estimated extrapolation value and the second estimated extrapolation value is decided from data on a present side of the data relevant to the first product, and an estimation value is calculated by performing synthesis between the first estimated extrapolation value and the second estimated extrapolation value based on the decided synthesis ratio.

9 Claims, 4 Drawing Sheets

STATE ESTIMATION DEVICE, STATE ESTIMATION METHOD AND STATE ESTIMATION PROGRAM

CROSS-REFERENCE TO RELATED APPLICATION

This application claims priority to Japanese Patent Application No. 2020-191896 filed on Nov. 18, 2020, incorporated herein by reference in its entirety.

BACKGROUND

1. Technical Field

The present disclosure relates to a state estimation device, a state estimation method and a state estimation program.

2. Description of Related Art

Japanese Unexamined Patent Application Publication No. 2006-309709 (JP 2006-309709 A) describes a result prediction device including: means for calculating a similarity degree between each sample in an actual result database in which production conditions and results of the production conditions are stored and a request point; means for creating a prediction formula close to the request point by a weighted regression in which the similarity degree is adopted as a weight; means for evaluating a parameter of the prediction formula by mathematical programming, using a targeted physical characteristic (for example, qualitative knowledge about a metallurgy phenomenon) as a constraint condition; and means for predicting a result for the request point using the prediction formula.

SUMMARY

For mass-produced industrial products, there is a need to collect data from individual products, for example, by means such as wireless communication, and to estimate future states of the individual products, as exemplified by future deterioration degrees, from the collected data. For the need, it is possible to expect improvement in estimation accuracy, by applying the technology described in JP 2006-309709 A and estimating the future state of an estimation-target individual by extrapolation based on past data about the estimation-target individual. However, because of just the extrapolation, there is a problem in that the estimation accuracy is still low in the case where the distance from samples used in learning is large, that is, in the case where a long-term prediction is performed.

Further, in the case of mass-produced industrial products, it is possible to collect data about different individuals (referred to as same-type different-individuals, hereinafter) having the same type as the estimation-target individual, and therefore, it is conceivable that the data about the same-type different-individuals is also used in the estimation of the future state of the estimation-target individual. In this case, since the data about the same-type different-individuals can include data about individuals that have been used for a longer period than the estimation-target individual, it is possible to expect change from the extrapolation to interpolation with respect to time, and it is possible to improve the estimation accuracy in the long-term prediction. However, there is a problem in that the use of the data about the same-type different-individuals rather decreases the estimation accuracy in the case where the estimation-target individual is an abnormal individual (for example, an abnormality due to production variation, an abnormality in use method or an abnormality in use environment).

When modeling is performed also in consideration of influence in the case where the estimation-target individual is an abnormal individual, there is a possibility that an estimation for an abnormal individual can be accurately performed and a long-term estimation can be performed. However, a large quantity of high-quality data is needed, and therefore, it is not realistic to perform modeling also in consideration of influence in the case where the estimation-target individual is an abnormal individual, from standpoints of cost and time.

The present disclosure has been made in view of the above fact, and has an object to provide a state estimation device, a state estimation method and a state estimation program that make it possible to realize the estimation for an abnormal individual and the long-term estimation at low cost, in the estimation of the future state of a first product.

A state estimation device according to a first aspect includes an estimation unit configured to estimate a future state of a first product, in which the estimation unit includes: a calculation unit configured to calculate a first estimated extrapolation value from data relevant to the first product, and to calculate a second estimated extrapolation value from data relevant to a second product that is different from the first product; a decision unit configured to decide a synthesis ratio between the first estimated extrapolation value and the second estimated extrapolation value; and a synthesis unit configured to perform synthesis between the first estimated extrapolation value and the second estimated extrapolation value, based on the synthesis ratio decided by the decision unit.

In the first aspect, in the estimation of the future state of the first product, the first estimated extrapolation value is calculated from the data relevant to the first product, and the second estimated extrapolation value is calculated from the data relevant to the second product that is different from the first product. Since the first estimated extrapolation value is calculated from the data relevant to the first product, the accuracy decreases in a long-term estimation, but a high estimation accuracy can be obtained even when the first product is an abnormal individual. Further, since the second estimated extrapolation value is calculated from the data relevant to the second product, the accuracy is low even for a short-term estimation in the case where the first product is an abnormal individual, but there is a possibility that the long-term estimation can be performed.

In this way, in the first aspect, the synthesis ratio between the first estimated extrapolation value and the second estimated extrapolation value is decided based on the complementary relation between the first estimated extrapolation value and the second estimated extrapolation value, and the synthesis between the first estimated extrapolation value and the second estimated extrapolation value is performed based on the decided synthesis ratio. Thereby, in the estimation of the future state of the first product, it is possible to realize the estimation for an abnormal individual and the long-term estimation at low cost, without a large quantity of data.

As a second aspect, in the first aspect, the second product may be a same-type different-individual of the first product.

With the second aspect, it is possible to more accurately calculate the second estimated extrapolation value, compared to a case where the second product does not have the same type as the first product.

As a third aspect, in the first aspect or the second aspect, the decision unit may decide the synthesis ratio from partial data of the data relevant to the first product, such that an estimation error for the partial data is minimized.

With the third aspect, it is possible to appropriately decide the synthesis ratio between the first estimated extrapolation value and the second estimated extrapolation value.

As a fourth aspect, in the third aspect, the data relevant to the first product may be time-series data, the calculation unit may calculate the first estimated extrapolation value from first data when the data relevant to the first product is divided into the first data and second data, the first data being data on an upstream side in a time-series order, the second data being data on a downstream side in the time-series order, and the decision unit may decide the synthesis ratio such that the estimation error for the second data as the partial data is minimized.

With the fourth aspect, it is possible to estimate the future state of the first product at a higher accuracy.

A state estimation method according to a fifth aspect causes a computer to execute a process in estimation of a future state of a first product, the process including: calculating a first estimated extrapolation value from data relevant to the first product, calculating a second estimated extrapolation value from data relevant to a second product that is different from the first product, and deciding a synthesis ratio between the first estimated extrapolation value and the second estimated extrapolation value; and performing synthesis between the first estimated extrapolation value and the second estimated extrapolation value, based on the decided synthesis ratio.

With the fifth aspect, similarly to the first aspect, in the estimation of the future state of the first product, it is possible to realize the estimation for an abnormal individual and the long-term estimation at low cost.

A state estimation program according to a sixth aspect causes a computer to execute a process in estimation of a future state of a first product, the process including: calculating a first estimated extrapolation value from data relevant to the first product, calculating a second estimated extrapolation value from data relevant to a second product that is different from the first product, and deciding a synthesis ratio between the first estimated extrapolation value and the second estimated extrapolation value; and performing synthesis between the first estimated extrapolation value and the second estimated extrapolation value, based on the decided synthesis ratio.

With the sixth aspect, similarly to the first aspect, in the estimation of the future state of the first product, it is possible to realize the estimation for an abnormal individual and the long-term estimation at low cost.

The present disclosure, as an effect, makes it possible to realize the estimation for an abnormal individual and the long-term estimation at low cost, in the estimation of the future state of the first product.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An exemplary embodiment of the present disclosure will be described below in detail, with reference to the drawings. Hereinafter, for a fuel cell vehicle (FCV) on which a fuel cell is mounted as a mass-produced industrial product, an aspect of estimation of a future deterioration degree as a future state of the fuel cell will be described. Further, an aspect in which "a voltage V of the fuel cell when an electric current I of the fuel cell is a predetermined value" is applied as an index (deterioration index) indicating the deterioration degree of the fuel cell will be described.

Figure 1:
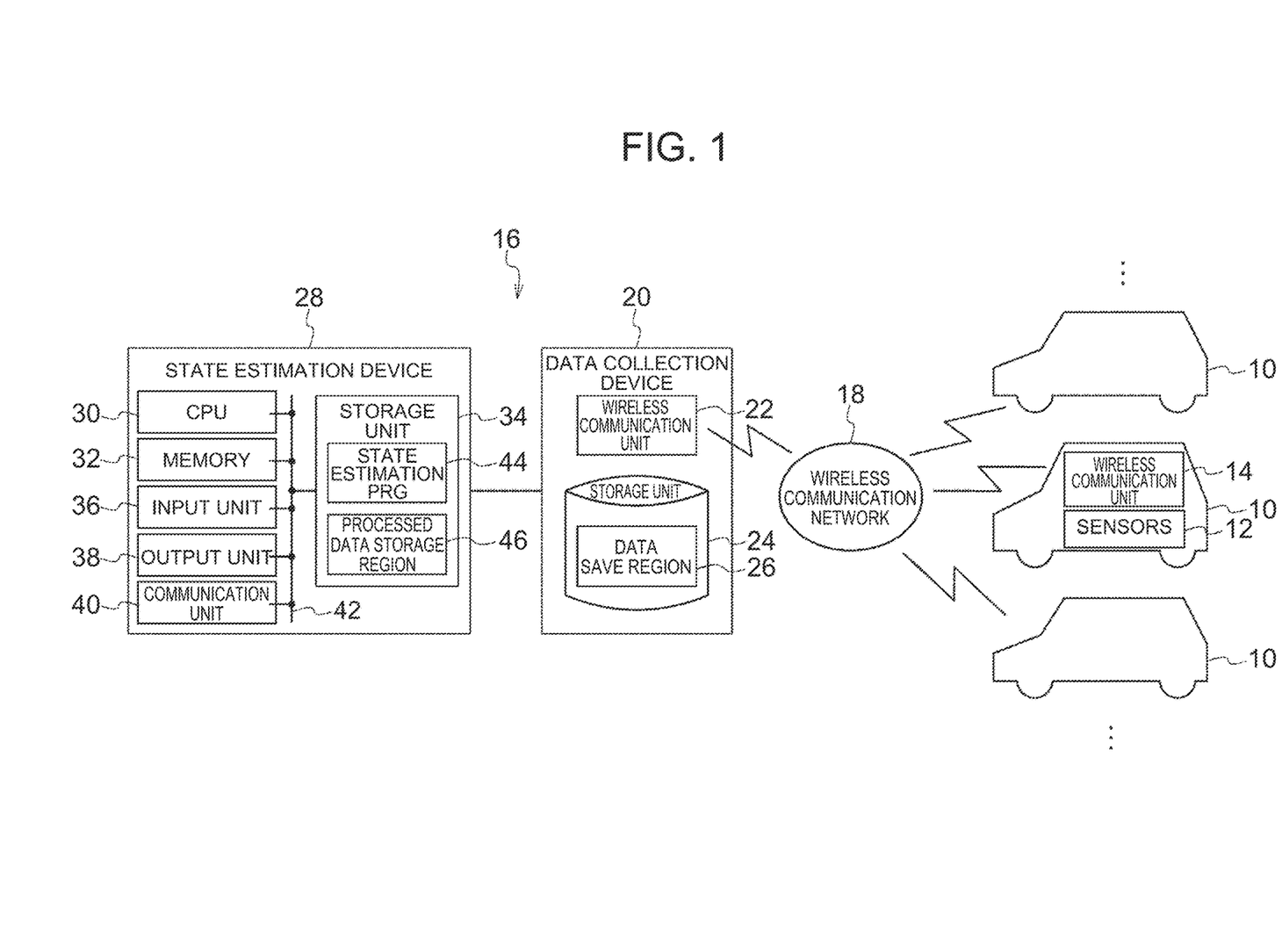
FIG. 1 is a block diagram showing a schematic configuration of a state estimation system according to an embodiment.

As shown in FIG. 1, sensors 12 and a wireless communication unit 14 are mounted on each of individual fuel cell vehicles 10 (referred to as merely vehicles 10, hereinafter) that is used by a user after being produced in a factory and being sold to the user. The sensors 12 periodically measure various physical quantities. Examples of the physical quantities to be measured by the sensors 12 include the voltage V, electric current I, temperature, odometer value, gas flow rate and gas pressure of the fuel cell. The wireless communication unit 14 adds measurement time, individual identification tag information previously set for identifying the individual vehicle (individual), and the like to the physical quantities measured by the sensors 12, and periodically sends the physical quantities to a state estimation system 16, as time history data.

The state estimation system 16 includes a data collection device 20 and a state estimation device 28, and the data collection device 20 and the state estimation device 28 are connected to each other in a communicable manner. The data collection device 20 includes a wireless communication unit 22 and a storage unit 24. The wireless communication unit 22 receives the time history data periodically sent from the individual vehicle 10, through a wireless communication network 18. In the storage unit 24, a data save region 26 is provided, and the time history data received by the wireless communication unit 22 from the individual vehicle 10 is stored in the data save region 26 of the storage unit 24.

The time history data stored in the data save region 26 includes the individual identification tag information, and the individual identification tag information includes information about the model type of the individual (vehicle 10). Thereby, in the estimation of the deterioration degree of the fuel cell of a first vehicle 10, data about a vehicle 10 having the same type as the first vehicle 10 can be identified based on the individual identification tag information.

The state estimation device 28 includes a central processing unit (CPU) 30, a memory 32 such as a read only memory (ROM) and a random access memory (RAM), and a non-volatile storage unit 34 such as a hard disk drive (HDD) and a solid state drive (SSD). Further, the state estimation device 28 includes an input unit 36 such as a keyboard and a mouse, an output unit 38 such as a display, and a communication unit 40. The CPU 30, the memory 32, the storage unit 34, the input unit 36, the output unit 38 and the communication unit 40 are connected to each other through an internal bus 42 in a communicable manner.

In the storage unit 34, a state estimation program 44 is stored, and a processed data storage region 46 is provided. In the state estimation device 28, the state estimation program 44 is read from the storage unit 34 and is expanded on the memory 32, and the state estimation program 44 expanded on the memory 32 is executed by the CPU 30. Thereby, the state estimation device 28 functions as an estimation unit 50, calculation unit 52, decision unit 54 and synthesis unit 56 shown in FIG. 2, and performs an advance preparation process and state estimation process described later.

Figure 2:
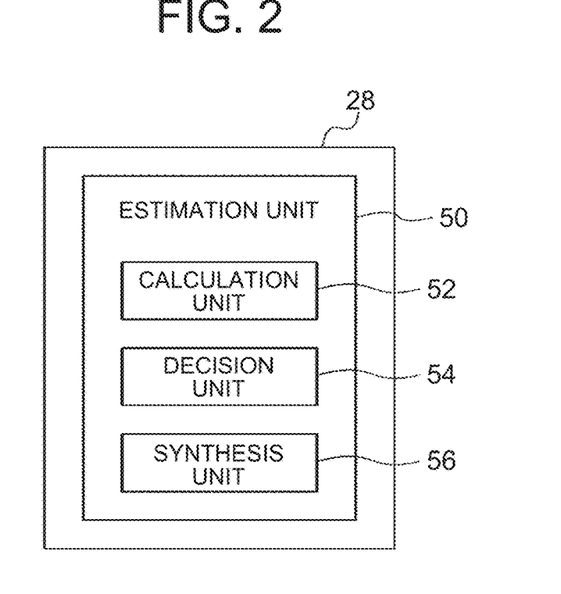
FIG. 2 is a functional block diagram of a state estimation device.

The estimation unit 50 estimates a future state of a first product (estimation target individual). The estimation unit 50 includes the calculation unit 52, the decision unit 54 and the synthesis unit 56. The calculation unit 52 calculates a first estimated extrapolation value from data relevant to the first product, and calculates a second estimated extrapolation value from data relevant to a second product (a same-type different-individual of the estimation-target individual in the embodiment) that is different from the first product. The decision unit 54 decides a synthesis ratio between the first estimated extrapolation value and the second estimated extrapolation value. Then, the synthesis unit 56 performs synthesis between the first estimated extrapolation value and the second estimated extrapolation value, based on the synthesis ratio decided by the decision unit 54.

Figure 3:
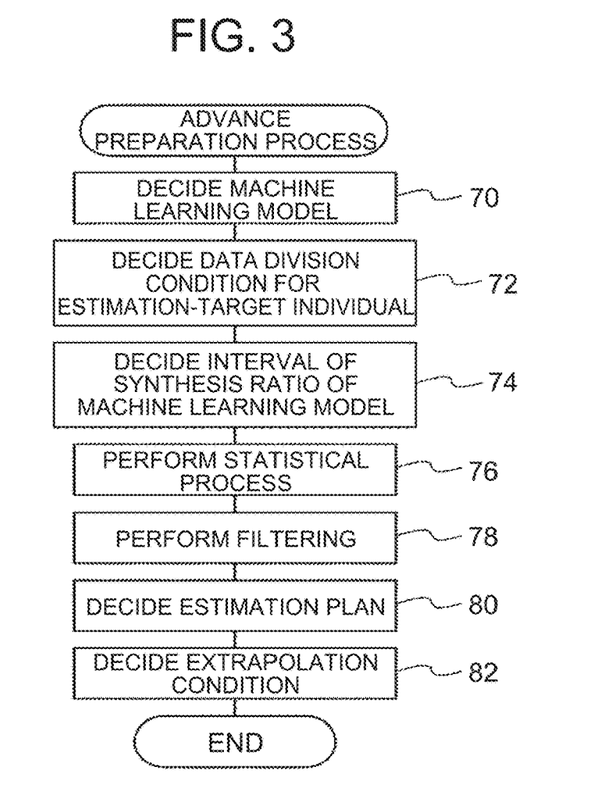
FIG. 3 is a flowchart showing an advance preparation process.
Figure 4:
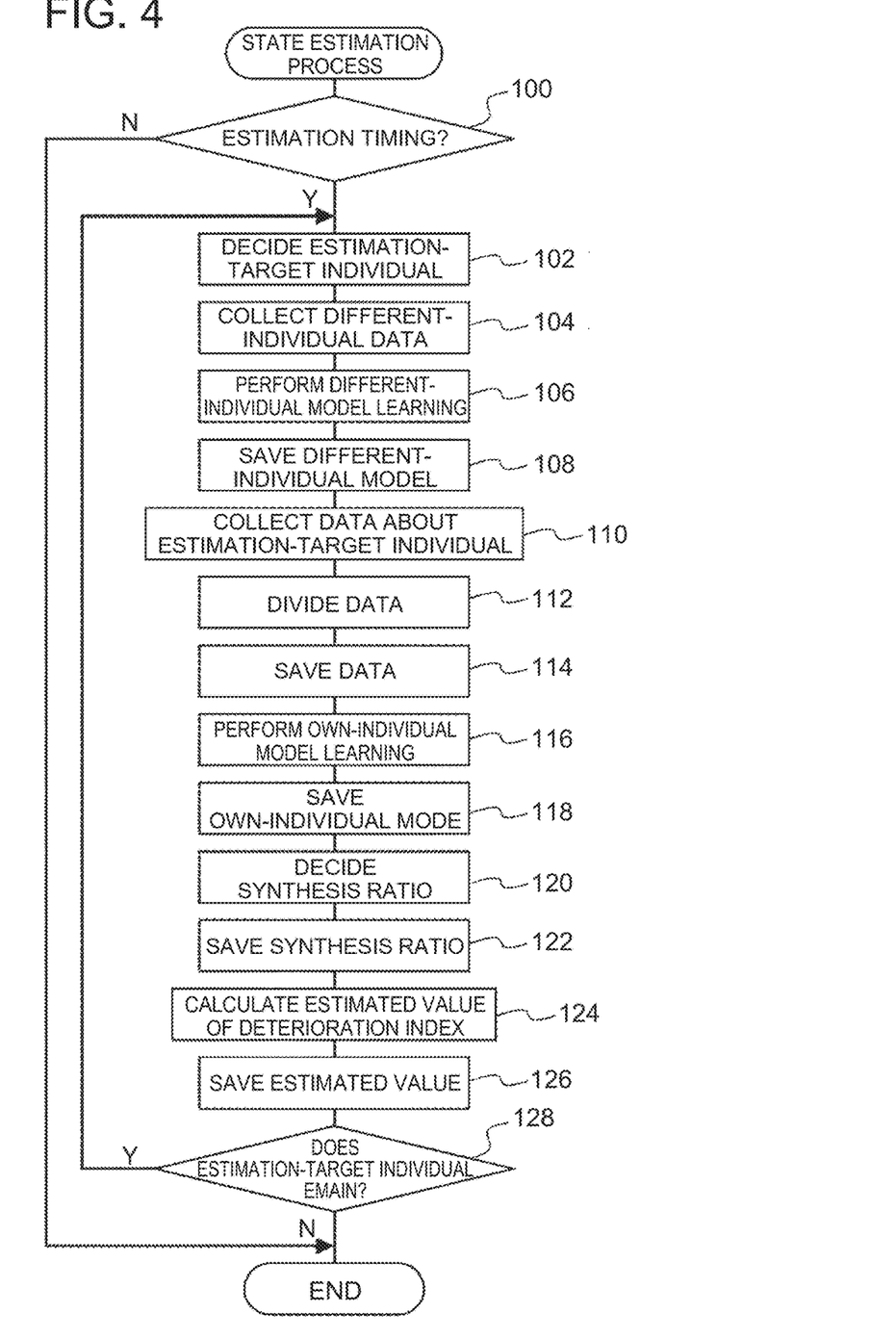
FIG. 4 is a flowchart showing a state estimation process.

Next, as an action of the embodiment, the advance preparation process that is performed by the state estimation device 28 will be described with reference to FIG. 3, before the description of the state estimation process (FIG. 4).

In step 70 of the advance preparation process, the estimation unit 50 decides a machine learning model that is used as a first machine learning model and a second machine learning model. In the embodiment, as an example, the estimation unit 50 decides that Elastic Net (a multiple regression analysis with a regularization term of L1/L2) is used as the first machine learning model and the second machine learning model.

In step 72, the estimation unit 50 decides a division condition for data about the estimation-target individual. In the embodiment, as an example, the estimation unit 50 decides the division condition such that sample data that is of the data about the estimation-target individual and that corresponds to 80 percent on an early side in the time-series order is adopted as data on a past side (upstream side) and sample data that corresponds to 20 percent on a late side in the time-series order is adopted as a present side (downstream side).

In step 74, the estimation unit 50 decides an interval of a synthesis ratio a between the first estimated extrapolation value calculated from the first machine learning model and the second estimated extrapolation value calculated from the second machine learning model. As an example, in the case where the estimation unit 50 decides that the interval of the synthesis ratio a is 0.1, the set of the synthesis ratio a is [0, 0.1, 0.2, 0.3, . . . , 0.9, 1.0].

In step 76, the estimation unit 50 performs a predetermined statistical process to data stored in the data save region 26 of the data collection device 20. As the predetermined statistical process, for example, the estimation unit 50 calculates an accumulated operating time of the fuel cell at a certain measurement time, from the electric currents I, voltages V and measurement times before the certain measurement time. Further, for example, the estimation unit 50 calculates a past temperature average at a certain measurement time, from temperatures before the certain measurement time. As necessary, a process of calculating a higher-order statistic (for example, standard deviation) may be applied.

In step 78, the estimation unit 50 performs filtering to the data after the statistical process in step 76, and thereby, obtains only data at times when the electric current I is the predetermined value. By this filtering, unequally spaced time-series data is generated, and the generated time-series data is stored in the processed data storage region 46. In the time-series data, data at each time includes a deterioration index V and a variable (accumulated operating time or the like) by which the deterioration index V can be explained. The former corresponds to an output variable (objective variable) of the machine learning model, and the latter corresponds to an input variable (explanatory variable) of the machine learning model.

In step 80, the estimation unit 50 decides an estimation plan including an execution timing of the state estimation process (FIG. 4) and a condition of an individual that is selected as an estimation target. In the embodiment, as an example, the estimation unit 50 decides the estimation plan, so as to perform the estimation for an individual for which the operating time has been increased by 100 hours or more relative to the operating time in the last estimation, at a fixed time every day.

In step 82, the estimation unit 50 decides an extrapolation condition for extrapolation estimation of the future deterioration index of the estimation-target individual. In the embodiment, as an example, the estimation unit 50 decides the extrapolation condition, so as to perform the estimation at a time point when the operating time has been increased by 100 hours relative to the operating time in the latest sample data.

Subsequently, the state estimation process that is performed by the state estimation device 28 will be described with reference to FIG. 4. In step 100 of the state estimation process, the estimation unit 50 determines whether the current timing is the timing of the estimation (the fixed time in the estimation plan decided in step 80). In the case where the negative determination is made, the estimation unit 50 ends the state estimation process. Every day, at the fixed time, the positive determination is made in step 100, the state estimation process transitions to step 102, and the estimation unit 50 stats processes in step 102 and subsequent steps.

In step 102, the estimation unit 50 decides the estimation-target individual. That is, first, the estimation unit 50 compares, for each individual, the latest operating time and the operating time in the last estimation, and adds an individual for which the operating time has been increased by 100 hours or more relative to the operating time in the last estimation, in an estimation-target individual list. The estimation unit 50 selects the estimation-target individual in order one by one from the estimation-target individual list, and repeats estimation processes in step 104 to step 128.

Figure 5:
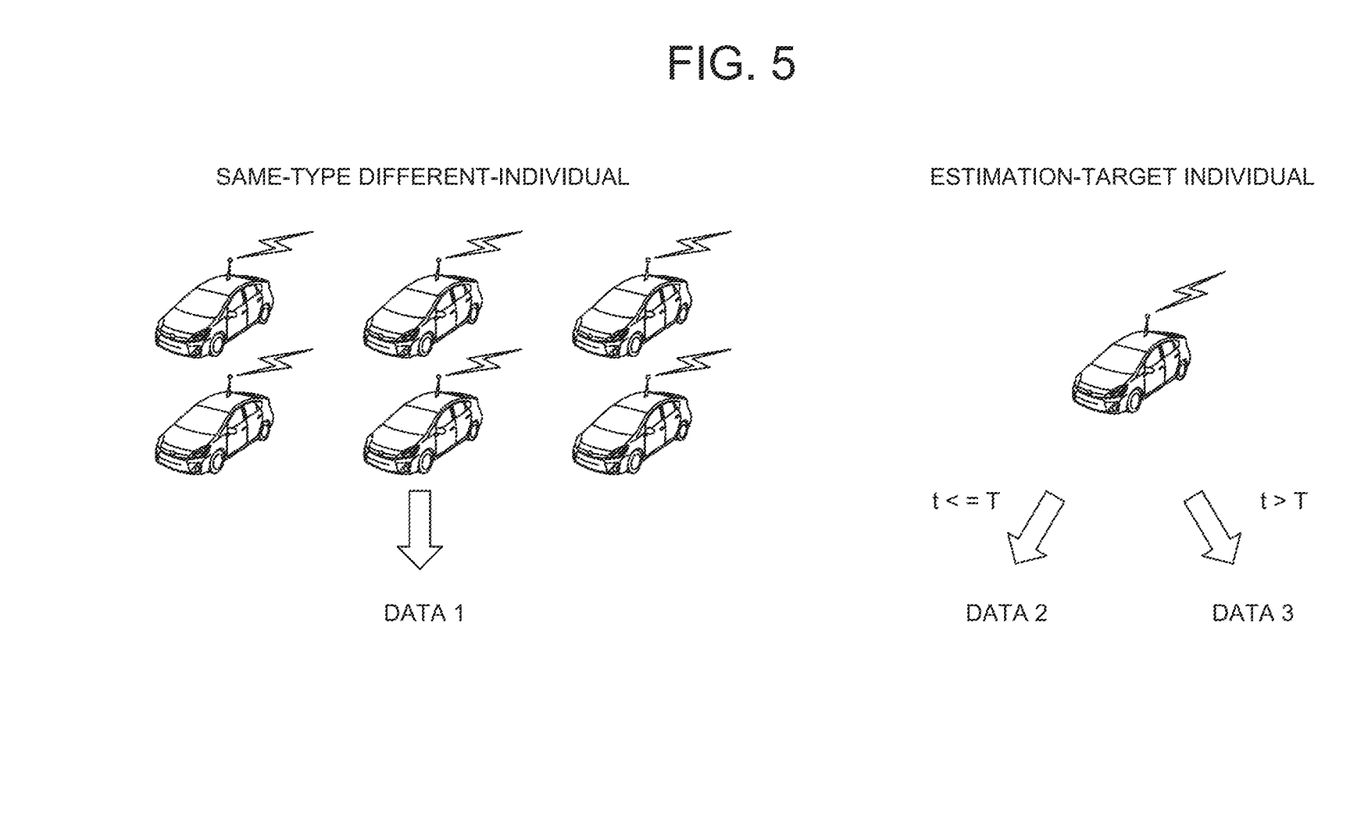
FIG. 5 is a conceptual diagram showing an outline of the state estimation process.

In step 104, the estimation unit 50 collects different-individual data (see "DATA 1" in FIG. 5). That is, the estimation unit 50 collects data about vehicles 10 having the same type as the estimation-target individual, from the data processed by the advance preparation process (FIG. 3) and stored in the processed data storage region 46. The data about the estimation-target individual is not included in the data that is collected in step 104. The individual identification tag information is removed at the stage of the collection of the data in step 104. Thereby, each sample data of the different-individual data has only information about the environment, operating condition and others after the production. In the case of the mass-produced industrial product, which continues to be constantly produced, a lot of sample data tends to have short operating times, and therefore, when appropriate, an imbalance measure is taken in light of a period of time when the estimation is intended.

In step 106, the calculation unit 52 performs learning of Elastic Net that is the second machine learning model decided in step 70, using the different-individual data collected in step 104, and calculates parameters such that a generalization error is minimized That is, the calculation unit 52 picks up some of the different-individual data, evaluates generalization performance by performing cross-validation, and decides contribution ratios of L1/L2 regularization terms ("$\alpha R_{L1}$" and "$\frac{1}{2}\cdot\alpha(1-R_{L1})$" in Formula (2)). Furthermore, using the contribution ratios of the L1/L2 regularization terms and the different-individual data, the calculation unit 52 calculates the contribution degree (weight) $C_j$ of each explanatory variable, such that the value to be obtained from Formula (2) is minimized Formula (1) is an estimation formula for the objective variable (the deterioration index V in the embodiment).

[Expression 1]

$$y = \sum_{j=1}^{M} C_j x_j + C_0 \quad (1)$$

Estimation Formula $$\frac{1}{2N}\sum_{n=1}^{N}\left(y_n - \left(\sum_{j=1}^{M} C_j x_{j,n} + C_0\right)\right)^2 + \alpha R_{L1}\sum_{j=1}^{M} |C_j| + \frac{1}{2}\alpha(1-R_{L1})\sum_{j=1}^{M} |C_j|^2 \quad (2)$$

Here, M is the number of explanatory variables (candidates), N is the number of sample data pieces for learning, y is an objective variable (the deterioration index V in the embodiment) to be estimated, and $y_n$ is the objective variable y of an n-th sample data piece for learning. Further, $x_j$ is an explanatory variable (candidate), j is the number of the explanatory variable, $x_{j,n}$ is an explanatory variable $x_j$ of the n-th sample data piece for learning, and $C_j$ is an intercept at j=0 and is the weight (linear slope or contribution degree) of the explanatory variable $x_j$ at j=1 to M. Further, $\alpha$ is a contribution degree factor for the multiple regression of the whole of the regularization terms, and the multiple regression coincides with a normal multiple regression, at $\alpha=0$. Further, $R_{L1}$ is a contribution degree of L1 regularization terms to whole of the regularization terms. The multiple regression coincides with a lasso regression at $R_{L1}=1$, and coincides with a ridge regression at $R_{L1}=0$.

In step 108, the calculation unit 52 saves the parameter (the contribution degree (weight) $C_j$ of each explanatory variable) of the second machine learning model obtained in step 106, in the memory 32 or the like. Since the second machine learning model is set to Elastic Net, it is possible to calculate the estimation formula (Formula (1)) for the explanatory variable, based on the parameter.

As described above, each sample data of the different-individual data has only the information about the environment, operating condition and others after the production. The different-individual model (second machine learning model) cannot explain influences of the variation in the estimation-target individual at the time of the production and the deviation of the use method due to the fixation of the user or use area of the estimation-target individual, but has learned data about individuals that operate in longer period than the estimation-target individual. Therefore, by performing the deterioration estimation of the estimation-target individual with the estimation using the second machine learning model, the state estimation device 28 can be expected to effectively function also in the estimation for a longer operating time than the operating time of the estimation-target individual.

In step 110, the estimation unit 50 collects own-individual data. That is, the estimation unit 50 collects data about the vehicle 10 including the estimation-target individual, from the data processed by the advance preparation process (FIG. 3) and stored in the processed data storage region 46.

In step 112, the estimation unit 50 divides the data about the estimation-target individual, into data (see "DATA 2" in FIG. 5) corresponding to 80 percent on the past side (upstream side) in the time-series order and data (see "DATA 3" in FIG. 5) corresponding to 20 percent on the present side (downstream side) in the time-series order, in accordance with the division condition for the data about the estimation-target individual that is decided in step 72. Hereinafter, the data on the past side is referred to as old own-individual data, and the data on the present side is referred to as new own-individual data.

In step 114, the estimation unit 50 saves each of the old own-individual data and new own-individual data after the division in step 112, in the memory 32 or the like.

In step 116, the calculation unit 52 performs learning of Elastic Net that is the first machine learning model decided in step 70, using the old own-individual data saved in step 114, and calculates parameters such that a generalization error is minimized That is, the calculation unit 52 picks up some of the old own-individual data, evaluates generalization performance by performing cross-validation, and decides contribution ratios of L1/L2 regularization terms ("$\alpha R_{L1}$" and "$\frac{1}{2}\cdot\alpha(1-R_{L1})$" in Formula (2)). Furthermore, using the contribution ratios of the L1/L2 regularization terms and the old own-individual data, the calculation unit 52 calculates the contribution degree (weight) $C_j$ of each explanatory variable, such that the value to be obtained from Formula (2) is minimized.

In step 118, the calculation unit 52 saves the parameter (the contribution degree (weight) $C_j$ of each explanatory variable) of the first machine learning model obtained in step 116, in the memory 32 or the like. Since the first machine learning model is set to Elastic Net, it is possible to calculate the estimation formula (Formula (1)) for the explanatory variable, based on the parameter.

The first machine learning model has learned only the old own-individual data, and therefore, has learned influences of the variation in the estimation-target individual at the time of the production and the deviation of the use method due to the fixation of the user or use area of the estimation-target individual, from the completely common sample data. To be exact, the common degree is higher compared to a case where the population includes all individuals, although component replacement may be performed in the estimation-target individual, the user of the estimation-target individual may be altered by the transfer or sale of the vehicle 10, or the estimation-target individual may be shared by unspecified users. Thereby, by performing the deterioration estimation of the estimation-target individual with the estimation using the first machine learning model, it is possible to avoid decrease in accuracy when the estimation-target individual is abnormal, although the future prediction ability of the first machine learning model is unknown.

In step 120, the decision unit 54 decides the synthesis ratio a between the first estimated extrapolation value calculated from the first machine learning model and the second estimated extrapolation value calculated from the second machine learning model (FIG. 5).

That is, first, the decision unit 54 calls the parameters of the own-individual modes (first machine learning model) saved in step 118 and the parameters of the different-individual model (second machine learning model) saved in step 108. Next, for the respective models, the decision unit 54 estimates the deterioration index V using the input variable of the new own-individual data saved in step 114.

Subsequently, when f represents the estimated value from the own-individual model and F represents the estimated value from the different-individual model, the decision unit 54 calculates the square of the difference between F×a+f× (1−a) and the deterioration index of the new own-individual data, for the synthesis ratio a=[0, 0.1, 0.2, 0.3, . . . , 0.9, 1.0], calculates the sum of the sample data, and decides the synthesis ratio a such that the sum is minimized. The decision unit 54 decides the synthesis ratio a, such that the value obtained from Formula (3) shown as follows is minimized $$\sum\_i \{F\_i \times a + f\_i \times (1-a) - y\_i\} \quad (3)$$

Here, y_i is the deterioration index of the new own-individual data, and i is the sample number of the new own-individual data. Further, f_i is the estimated value from the own-individual model, and F_i is the estimated value from the different-individual model.

In the case where the estimation accuracy of the own-individual model can be expected to be higher than the estimation accuracy of the different-individual model, the synthesis ratio a to be decided in step 120 becomes low, and in the reverse case, the synthesis ratio a to be decided in step 120 becomes high. By deciding the synthesis ratio a based on the new own-individual data, a better model can have a higher contribution degree. Furthermore, this process can be executed mechanically and automatically, and therefore, is effective in the case where there are large amounts of mass-produced products.

In step 122, the decision unit 54 saves the synthesis ratio a decided in step 120, in the memory 32 or the like.

In step 124, the estimation unit 50 calculates the estimated value of the deterioration index. That is, first, the estimation unit 50 calculates the future input variable (explanatory variable) that is intended to be estimated. Here, a linear extrapolation is employed for accumulated amount, assuming that the estimation-target individual is statistically used in the same manner as in the past. For example, in the case where the extrapolation condition is "the estimation is performed at the time point when the operating time has been increased by 100 hours relative to the operating time in the latest sample data", when t represents the operating time in the latest data, the accumulated amount is a value resulting from multiplying the latest value by (t+100)/100. In the case where seasonal variation is predicted, the estimation is performed by a method depending on the seasonal variation. Further, the historic average is not changed from the latest value. This is because it is assumed that the number of samples for calculating the average increases with the increase in the operating time, so that the average converges on a fixed value, and it is assumed that the average has already converged on roughly the fixed value at the latest time.

Using the above estimated input variable, the calculation unit 52 calculates the first estimated extrapolation value f by estimating the deterioration index with the own-individual model (first machine learning model) for which the parameter is saved in step 118, and calculates the second estimated extrapolation value F by estimating the deterioration index with the different-individual model (second machine learning model) for which the parameter is saved in step 108 (FIG. 5). Then, using the synthesis ratio a saved in step 122, the synthesis unit 56 calculates a synthesis value=F×a+f× (1−a) between the first estimated extrapolation value f and the second estimated extrapolation value F. This is the final estimated value.

In step 126, the estimation unit 50 adds the individual identification tag information about the estimation-target individual to the final estimated value obtained in step 124, and saves the estimated value in the storage unit 34 or the like. The final estimated value (for example, the estimated value of the deterioration index V at the time point when the operating time has been increased by 100 hours) saved in step 126 is referred to, for example, at the time of the inspection of the vehicle 10, and is used for the determination of whether the fuel cell is replaced.

Next, in step 128, the estimation unit 50 determines whether the estimation-target individual remains in the estimation-target individual list. In the case where the positive determination is made in step 128, the state estimation process returns to step 102, and the processes in step 102 and the subsequent steps are repeated for the estimation-target individual remaining in the estimation-target individual list. In the case where the negative determination is made in step 128, the state estimation process ends.

As described above, in the embodiment, the estimation unit 50 estimates the future state of the first product (estimation-target individual). Further, the estimation unit 50 includes the calculation unit 52, the decision unit 54 and the synthesis unit 56. The calculation unit 52 calculates the first estimated extrapolation value from the data relevant to the first product, and calculates the second estimated extrapolation value from the data relevant to the second product (the same-type different-individual of the estimation-target individual in the embodiment) that is different from the first product. The decision unit 54 decides the synthesis ratio between the first estimated extrapolation value and the second estimated extrapolation value. Then, the synthesis unit 56 performs the synthesis between the first estimated extrapolation value and the second estimated extrapolation value, based on the synthesis ratio decided by the decision unit 54. Thereby, in the estimation of the future state of the first product, it is possible to realize the estimation for an abnormal individual and the long-term estimation at low cost, without a large quantity of data.

In the embodiment, the second product is the same-type different-individual of the first product. Thereby, it is possible to more accurately calculate the second estimated extrapolation value, compared to a case where the second product does not have the same type as the first product.

In the embodiment, the decision unit 54 decides the synthesis ratio from partial data of the data relevant to the first product, such that the estimation error for the partial data is minimized Thereby, it is possible to appropriately decide the synthesis ratio between the first estimated extrapolation value and the second estimated extrapolation value.

In the embodiment, the data relevant to the first product is time-series data, the calculation unit 52 calculates the first estimated extrapolation value from first data when the data relevant to the first product is divided into the first data and second data, the first data being data on an upstream side in a time-series order, the second data being data on a downstream side in the time-series order, and the decision unit 54 decides the synthesis ratio such that the estimation error for the second data as the partial data is minimized Thereby, it is possible to estimate the future state of the first product at a higher accuracy.

An aspect in which the same-type different-individual of the first product is applied as the second product has been described above, but the present disclosure is not limited to this. As an example, a vehicle in which the second product is a fuel cell that does not have the same type as the first product but has the same model type as the first product may be applied.

Further, an aspect in which Elastic Net is applied as the first machine learning model and the second machine learning model has been described above. However, the present disclosure is not limited to this, and for example, a different machine learning model such as the ridge regression and the lasso regression may be applied as at least one of the first machine learning model and the second machine learning model.

Further, an aspect in which the future deterioration degree of the fuel cell mounted on the vehicle 10 (FCV) is estimated has been described above. However, the present disclosure is not limited to this, and for example, can be used for the estimation of the future state of a different product, as exemplified by the future abrasion degree of a product on which abrasion is generated with age.

Further, an aspect in which the state estimation program 44 according to the present disclosure is previously stored (installed) in the storage unit 34 has been described above. However, the state estimation program according to the present disclosure can be provided while being recorded in a non-volatile recording medium such as an HDD, an SSD and a DVD.

What is claimed is:

1. A state estimation device, comprising:
a processor configured to:
divide data relevant to a first vehicle into first data and second data, wherein
the data relevant to the first vehicle is time-series data including a deterioration index indicating a deterioration degree of a fuel cell of the first vehicle,
the first data is on an upstream side in a time-series order of the time-series data, and
the second data is on a downstream side in the time-series order of the time-series data,
perform learning of a first machine learning model using the first data,
calculate (i) a first estimated extrapolation value from the first machine learning model from the data relevant to the first vehicle, and (ii) a second estimated extrapolation value from a second machine learning model from data relevant to a second vehicle that is different from the first vehicle, wherein the second machine learning model learned from the data relevant to the second vehicle,
decide a synthesis ratio between the first estimated extrapolation value and the second estimated extrapolation value, wherein an estimation error for the second data is minimized,
perform synthesis between the first estimated extrapolation value and the second estimated extrapolation value, based on the synthesis ratio, and
estimate a future state of the first vehicle based on the synthesis, wherein the future state includes a future deterioration degree of the fuel cell of the first vehicle, wherein
the second vehicle is a fuel cell vehicle in which a fuel cell does not have a same type as the fuel cell of the first vehicle,
the second vehicle has a same model type as the first vehicle, and
the processor is further configured to, before dividing of the data relevant to the first vehicle, perform an advance preparation process, the advance preparation process includes:
deciding (a) the first machine learning model, (b) the second machine learning model, (c) a division condition for the data relevant to the first vehicle, and (d) an interval of the synthesis ratio,
performing a predetermined statistical process to the data relevant to the first vehicle,
after the predetermined statistical process, generating the time-series data being unequally spaced by performing filtering on the data relevant to the first vehicle and obtaining only the data relevant to the first vehicle at times when an electric current is a predetermined value,
deciding an estimation plan including a condition of the first vehicle, and
deciding an extrapolation condition for estimating the future state of the first vehicle.

2. The state estimation device according to claim 1, wherein
the data relevant to the first vehicle includes the electric current measured by a sensor on the first vehicle.

3. The state estimation device according to claim 2, wherein
the first data corresponds to 80 percent on the upstream side in the time-series order of the time-series data, and
the second data corresponds to 20 percent on the downstream side in the time-series order of the time-series.

4. A state estimation method that causes a computer to execute a process in estimation of a future state of a first vehicle, the process comprising:
dividing data relevant to the first vehicle into first data and second data, wherein
the data relevant to the first vehicle is time-series data including a deterioration index indicating a deterioration degree of a fuel cell of the first vehicle,
the first data is on an upstream side in a time-series order of the time-series data, and
the second data is on a downstream side in the time-series order of the time-series data;
performing learning of a first machine learning model using the first data;
calculating (i) a first estimated extrapolation value from the first machine learning model from the data relevant to the first vehicle, and (ii) a second estimated extrapolation value from a second machine learning model from data relevant to a second vehicle that is different from the first vehicle, wherein the second machine learning model learned from the data relevant to the second vehicle;
deciding a synthesis ratio between the first estimated extrapolation value and the second estimated extrapolation value, wherein an estimation error for the second data is minimized;

performing synthesis between the first estimated extrapolation value and the second estimated extrapolation value, based on the decided synthesis ratio; and estimating the future state of the first vehicle based on the synthesis, wherein the future state includes a future deterioration degree of the fuel cell of the first vehicle, wherein the second vehicle is a fuel cell vehicle in which a fuel cell does not have a same type as the fuel cell of the first vehicle, the second vehicle has a same model type as the first vehicle, and the process further comprises:

before the dividing of the data relevant to the first vehicle, performing an advance preparation process, the advance preparation process includes:

deciding (a) the first machine learning model, (b) the second machine learning model, (c) a division condition for the data relevant to the first vehicle, and (d) an interval of the synthesis ratio, performing a predetermined statistical process to the data relevant to the first vehicle, after the predetermined statistical process, generating the time-series data being unequally spaced by performing filtering on the data relevant to the first vehicle and obtaining only the data relevant to the first vehicle at times when an electric current is a predetermined value, deciding an estimation plan including a condition of the first vehicle, and deciding an extrapolation condition for estimating the future state of the first vehicle.

5. The state estimation method according to claim 4, wherein the data relevant to the first vehicle includes the electric current measured by a sensor on the first vehicle.

6. The state estimation method according to claim 5, wherein the first data corresponds to 80 percent on the upstream side in the time-series order of the time-series data, and the second data corresponds to 20 percent on the downstream side in the time-series order of the time-series.

7. A non-transitory computer readable storage medium storing a state estimation program which, when executed by a computer, causes the computer to execute a process in estimation of a future state of a first vehicle, the process comprising:

dividing data relevant to the first vehicle into first data and second data, wherein the data relevant to the first vehicle is time-series data including a deterioration index indicating a deterioration degree of a fuel cell of the first vehicle, the first data is on an upstream side in a time-series order of the time-series data, and the second data is on a downstream side in the time-series order of the time-series data;

performing learning of a first machine learning model using the first data;

calculating (i) a first estimated extrapolation value from the first machine learning model from the data relevant to the first vehicle and (ii) a second estimated extrapolation value from a second machine learning model from data relevant to a second vehicle that is different from the first vehicle, wherein the second machine learning model learned from the data relevant to the second vehicle;

deciding a synthesis ratio between the first estimated extrapolation value and the second estimated extrapolation value, wherein an estimation error for the second data is minimized;

performing synthesis between the first estimated extrapolation value and the second estimated extrapolation value, based on the decided synthesis ratio; and estimating the future state of the first vehicle based on the synthesis, wherein the future state includes a future deterioration degree of the fuel cell of the first vehicle, wherein the second vehicle is a fuel cell vehicle in which a fuel cell does not have a same type as the fuel cell of the first vehicle, the second vehicle has a same model type as the first vehicle, and the process further comprises:

before the dividing of the data relevant to the first vehicle, performing an advance preparation process, the advance preparation process includes:

deciding (a) the first machine learning model, (b) the second machine learning model, (c) a division condition for the data relevant to the first vehicle, and (d) an interval of the synthesis ratio, performing a predetermined statistical process to the data relevant to the first vehicle, after the predetermined statistical process, generating the time-series data being unequally spaced by performing filtering on the data relevant to the first vehicle and obtaining only the data relevant to the first vehicle at times when an electric current is a predetermined value, deciding an estimation plan including a condition of the first vehicle, and deciding an extrapolation condition for estimating the future state of the first vehicle.

8. The non-transitory computer readable storage medium according to claim 7, wherein the data relevant to the first vehicle includes the electric current measured by a sensor on the first vehicle.

9. The non-transitory computer readable storage medium according to claim 8, wherein the first data corresponds to 80 percent on the upstream side in the time-series order of the time-series data, and the second data corresponds to 20 percent on the downstream side in the time-series order of the time-series.

* * * * *